(12) United States Patent
Portisch et al.

(10) Patent No.: US 12,229,090 B2
(45) Date of Patent: Feb. 18, 2025

(54) AUTOMATIC ENFORCEMENT OF STANDARDIZED DATA MODEL MAPPING

(71) Applicant: SAP SE, Walldorf (DE)

(72) Inventors: Jan Portisch, Bruchsal (DE); Michael Hladik, Walldorf (DE); Yannik Hahn, Mannheim (DE)

(73) Assignee: SAP SE, Walldorf (DE)

( * ) Notice: Subject to any disclaimer, the term of this patent is extended or adjusted under 35 U.S.C. 154(b) by 71 days.

(21) Appl. No.: 18/096,409

(22) Filed: Jan. 12, 2023

(65) Prior Publication Data

US 2024/0241865 A1   Jul. 18, 2024

(51) Int. Cl.
*G06F 16/21*   (2019.01)
*G06F 16/25*   (2019.01)

(52) U.S. Cl.
CPC .......... *G06F 16/212* (2019.01); *G06F 16/258* (2019.01)

(58) Field of Classification Search
CPC .............................. G06F 16/212; G06F 16/258
USPC .......................................................... 707/803
See application file for complete search history.

(56) References Cited

U.S. PATENT DOCUMENTS

| | | | |
|---|---|---|---|
| 11,741,102 B1 * | 8/2023 | Fuglsang | G06F 16/2448 707/714 |
| 2006/0195460 A1 * | 8/2006 | Nori | G06F 16/252 |
| 2008/0228697 A1 * | 9/2008 | Adya | G06F 16/212 |
| 2017/0017709 A1 * | 1/2017 | Sarferaz | G06F 16/27 |
| 2021/0117437 A1 * | 4/2021 | Gibson | G06F 16/258 |
| 2023/0385036 A1 * | 11/2023 | Vacchi | G06F 8/35 |

OTHER PUBLICATIONS

European Search Report received in European Application No. 23215926.9, dated May 13, 2024, 10 pages.

* cited by examiner

*Primary Examiner* — Giovanna B Colan
(74) *Attorney, Agent, or Firm* — Klarquist Sparkman, LLP

(57) ABSTRACT

Techniques and solutions are provided for improved data modelling, including techniques that facilitate data model comparison, integration, or deployment. A core data model is created that has a plurality of elements, which can represent semantic concepts, including relationships between semantic concepts. A plurality of domain models are mapped to core data model elements. In particular, when a domain model element is to be created, the element is mapped to a core data model element. When a relation is to be established between two domain model elements, the relation is mapped to a relation type represented in the core data model. Mapping to a core data model can be enforced as part of domain model creation, allowing different domain models to be compared, since domain elements in different domain models that represent a common semantic will be mapped to the same core data model element.

20 Claims, 14 Drawing Sheets

| Relation | Name | Description | Inverse Relation | Identifier | Parent |
|---|---|---|---|---|---|
| HasPart | Has Part | | isPartOf | RTY-001 | Has |
| HasComponent | Has Component | Is a subclass of the hasPart relation type that describes a component-integral object relationship, which defines a composition/aggregation of part to a whole. Example: /SAP/SIG/BMM/BusinessMetric hasComponent SAP/SIG/BusinessMetricMeasurement; BMM/SAP/SIG/BMM/BusinessMetricMeasurementhasComponent /SSAP/SIG/BMM/BusinessMetricMeasurementSegment | isComponentOf | RTY-002 | Has Part |
| correspondsTo | Corresponds To | Describes the relation of two similar or equal Types from different domains that typically refer to the same stereotype of which they are realizations of. Example: /SAP/CPM/BPX/ScopeItem correspondsTo /SAP/EARL/BAD/BusinessActivity; /SAP/SIG/BMM/LineOfBusiness correspondsTo /SAP/IVA/VLM/LineOfBusiness | correspondsTo | RTY-003 | | triggers
isTriggeredBy
hasTaxonomy
isTaxonomyOf
hasUnit
isUnitOf
hasVariant
isVariantOf
hasVersion
isVersionOf
impacts
impactedBy
isInstanceOf
hasInstance
owns
isOwnedBy performs
isPerformedBy
processes
isProcessedBy
publishes
isPublishedBy
references
isReferencedBy
requires
requiredBy
sets
isSetBy
used
isUsedBy
hasAttribute
isAttributeOf

FIG. 6

| Relation | Name | Description | Inverse Relation | Identifier | Parent |
|---|---|---|---|---|---|
| subClassOf | SubClass Of | | hasSubClass | CRTY-000 | |
| isRealizationOf | Is Realization Of | | hasRealization | CRTY-001 | |
| isFrontrunnerOf | Is FrontRunner Of | | hasFrontrunner | CRTY-002 | |

FIG. 7

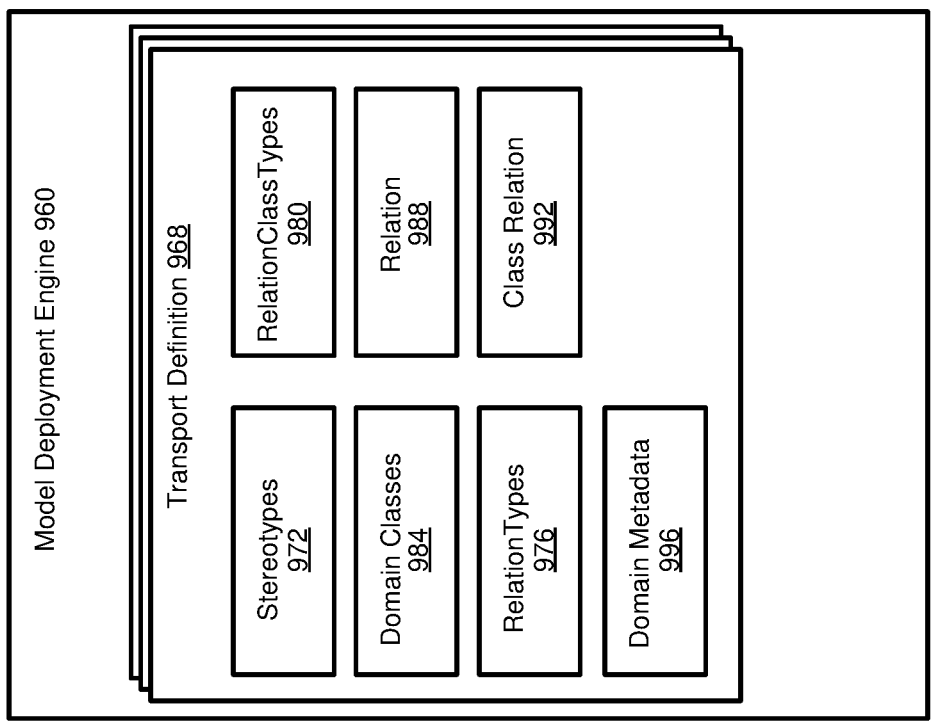
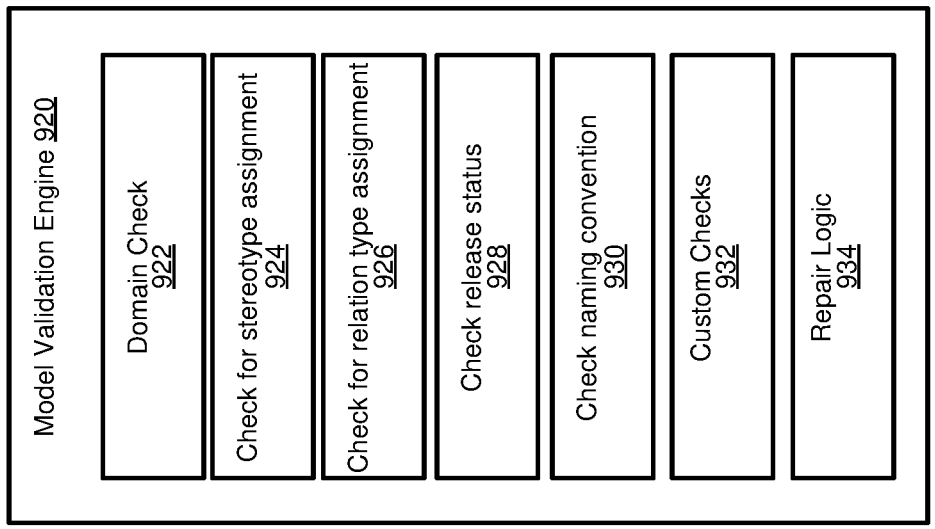
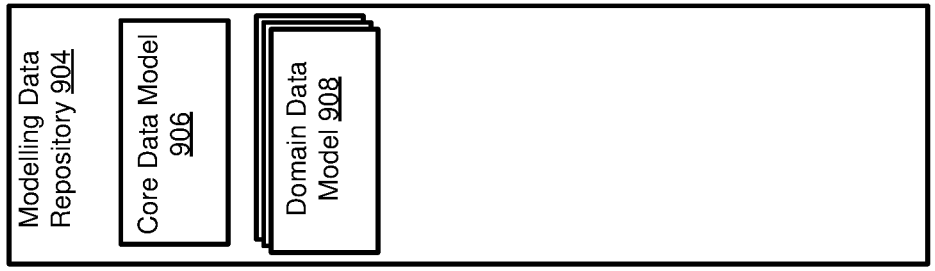
FIG. 9

AUTOMATIC ENFORCEMENT OF STANDARDIZED DATA MODEL MAPPING

FIELD

The present disclosure generally relates to relating data models. Particular implementations relate to mapping elements of domain data models to elements of a core data model, including for purposes of integrating data model content.

BACKGROUND

Many software applications use data organized according to a data model. For example, a physical data model defines structures that are used to store or access data, such as database tables or database views. In some cases, a conceptual data model is used to model data at a higher semantic level, which can be useful as it can provide people with greater knowledge of what particular data represents, and how the data will be used, to define how the data should be organized. This conceptual data model can then be employed by more technical users to create a physical data model that can be used by a database to store data. For example, a technical user can define DDL (data definition language) statements that, when executed, will create objects in the physical data model (which in turn correspond to objects in the conceptual data model).

Data models can be extraordinarily complex, particularly for large enterprises. For a single operational area, a data model can have thousands of entities (such as tables or views), attributes (such as fields/columns of tables and views), and relations between entities and attributes (for example, "associations" as implemented in CDS entities, or primary key-foreign key relations between physical database entities).

Issues can arise when trying to integrate data across an enterprise, or otherwise attempting to "match" two data models (also referred to as "schemas"), in particular when the data models are complex. As an example, two schemas may have data objects representing a common semantic concept. An accounting software application may have a data object representing a customer, used for billing purposes, while a CRM application may also have a data object representing a customer. However, the data objects in the two schemas can have different names/identifiers, different attributes (which can include attributes that are different in their semantics or where attributes have a common semantic meaning but have different names/identifiers), and different relations to other data objects in their respective schemas.

Similar issues can arise if it is desired to integrate data from different software applications that are used for a similar purpose, such as accounting software provided by two different vendors, where the vendors have their own specific schemas. These types of "integration" issues can also arise if it is desired to migrate from one system (or software application) to another.

If data is not integrated, "data silos" can be created. With data silos, multiple, potentially inconsistent, versions of data can exist (for example, if a customer address is updated in one software application but not in another). Or, data can be incomplete, such as if certain transactions are recorded in one software application or database but not in another. If it were feasible to integrate information from multiple data models, these issues could be more easily addressed, however, data integration itself presents challenges.

That is, typically an individual or team of individuals manually undertake a schema matching task. Given that thousands of schema elements can exist in both schemas, matching the two schemas can be extraordinarily time consuming and complex. Errors can be likely to occur, and may not be caught until later testing, or in worse case scenarios when the data models are used in a production environment. Additional work is typically required to implement the schemas for productive use in computing tasks, as the output of an initial schema matching process is typically in a conceptual format, and recorded in a manner that cannot be directly implemented in a computing system. For example, the outcome of the schema matching process may be a spreadsheet having mapping information for schema elements. This initial output may then be converted by more technical users into a physical data model that can be implemented. However, the conversion process involves even more effort, and provides additional possibilities for the introduction of errors. Further, data models are often changed—entities can be added or removed, attributes can be modified, and relations between schema elements can change. Thus, even despite the huge effort in producing a schema mapping, mappings can quickly become out of date, and incorrect, as it can be difficult to capture schema changes in a way that is quickly and easily transferred to a "global data model," or an electronic document, file, or data object that captures schema matching information. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for improved data modelling, including techniques that facilitate data model comparison, integration, or deployment. A core data model is created that has a plurality of elements, which can represent semantic concepts, including relationships between semantic concepts. A plurality of domain models are mapped to core data model elements. In particular, when a domain model element is to be created, the element is mapped to a core data model element. When a relation is to be established between two domain model elements, the relation is mapped to a relation type represented in the core data model. Mapping to a core data model can be enforced as part of domain model creation, allowing different domain models to be compared, since domain elements in different domain models that represent a common semantic will be mapped to the same core data model element.

In one aspect, the present disclosure provides techniques for creating a domain model, including mapping elements of the domain model to elements of a core model. First input is received to create a first domain data model element for a first domain data model. Second input is received to assign the first domain data model element of the first domain data model to a first core data model element. It is determined that the first domain data model element of the first domain data model has been assigned to the first core data model element. Based at least in part on the determining that the first domain data model element of the first domain data model has been assigned to the first core data model element, the first domain data model element of the first domain data model is persisted.

Third input is received to create a second domain data model element for the first domain data model. Fourth input is received to assign the second domain data model element of the first domain data model to a second core data model element. Based at least in part on the determining that the second domain data model element of the first domain data model has been assigned to the first core data model element, the second domain data model element of the first domain data model is persisted.

Fifth input is received to create a first relationship between the first domain data model element of the first domain data model and the second domain data model element of the first domain data model. Sixth input to assign to the first relationship a first relationship type for the core data model is received. It is determined that the first relationship has been assigned the first relationship type. Based at least in part on the determining that the first relationship has been assigned the first relationship type, the first relationship is persisted.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 6 provides a table illustrating how instance relation types between two domain classes can be maintained.

FIG. 7 provides a table illustrating how class relation types between two domain classes can be maintained.

FIG. 9 illustrates how a model validation engine and a model deployment engine can be used to deploy domain data models that have been mapped to a core data model.

DETAILED DESCRIPTION

Example 1—Overview

Figure 1:
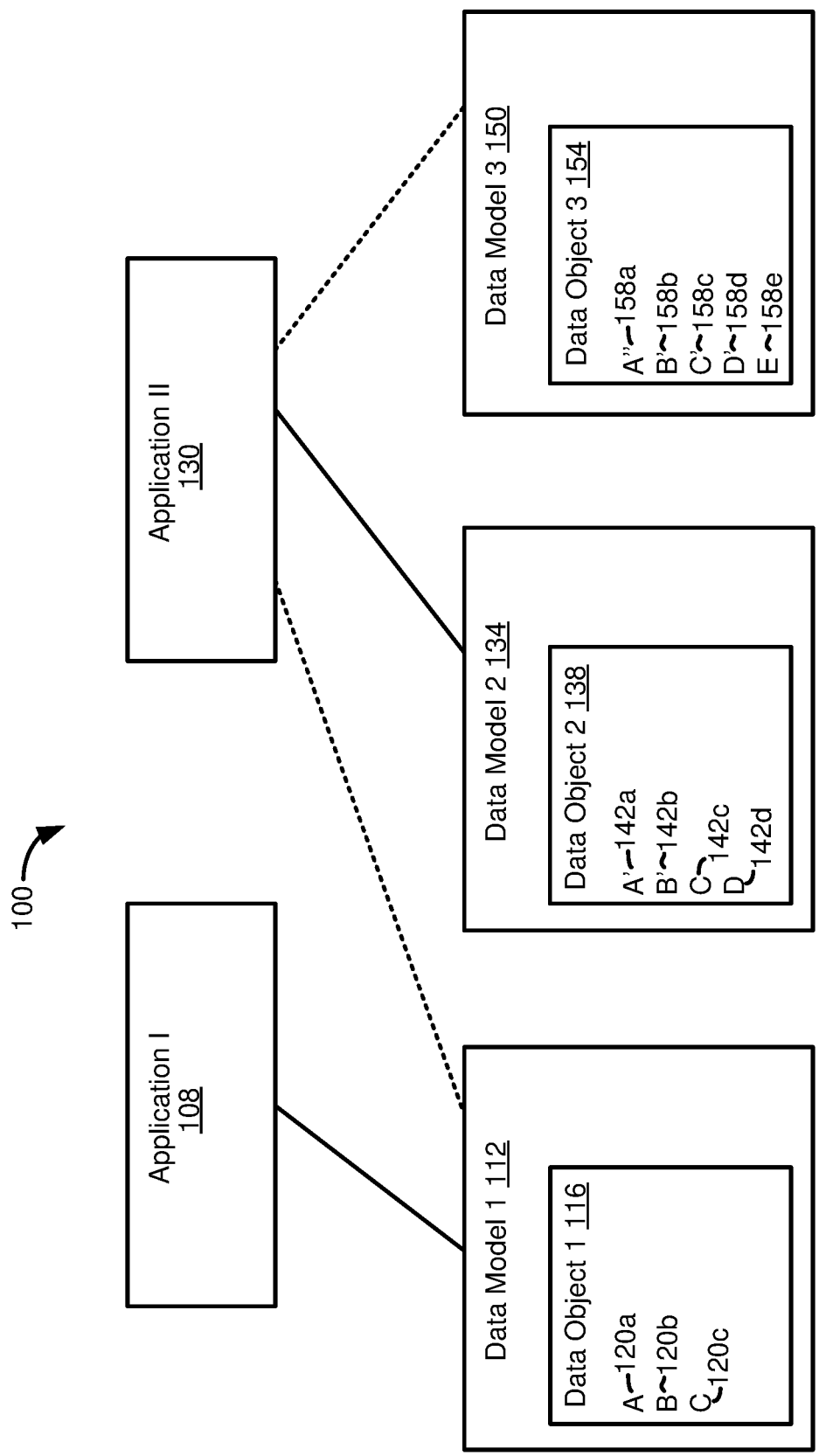
FIG. 1 is a diagram illustrating how software applications can be associated with data in data models, and where it may be desirable for a software application to integrate data from different data models.

Many software applications use data organized according to a data model. For example, a physical data model defines structures that are used to store or access data, such as database tables or database views. In some cases, a conceptual data model is used to model data at a higher semantic level, which can be useful as it can provide people with greater knowledge of what particular data represents, and how the data will be used, to define how the data should be organized. This conceptual data model can then be employed by more technical users to create a physical data model that can be used by a database to store data. For example, a technical user can define DDL (data definition language) statements that, when executed, will create objects in the physical data model (which in turn correspond to objects in the conceptual data model).

Data models can be used in other contexts, including in virtual data models, such as implemented in CDS (Core Data Services) views as implemented in technologies available from SAP SE of Walldorf, Germany. Virtual data models can reference objects in a physical data model. In particular, in SAP technologies, CDS entities can reference tables and views of the HANA database, also of SAP SE. In turn, higher level data objects, such as logical data objects, can have models, which can refer to data objects in a virtual data model. In technologies provided by SAP SE, BusinessObject are a type of logical data object that can be modelled with reference to CDS entities.

Data models can be extraordinarily complex, particularly for large enterprises. For a single operational area, a data model can have thousands of entities (such as tables or views), attributes (such as fields/columns of tables and views), and relations between entities and attributes (for example, "associations" as implemented in CDS entities, or primary key-foreign key relations between physical database entities).

Issues can arise when trying to integrate data across an enterprise, or otherwise attempting to "match" two data models (also referred to as "schemas"), particularly when the data models are complex. As an example, two schemas may have data objects representing a common semantic concept. An accounting software application may have a data object representing a customer, used for billing purposes, while a CRM application may also have a data object representing a customer. However, the data objects in the two schemas can have different names/identifiers, different attributes (which can include attributes that are different in their semantics or where attributes have a common semantic meaning but have different names/identifiers), and different relations to other data objects in their respective schemas.

Similar issues can arise if it is desired to integrate data from different software applications that are used for a similar purpose, such as accounting software provided by two different vendors, where the vendors have their own specific schemas. These types of "integration" issues can also arise if it is desired to migrate from one system (or software application) to another.

If data is not integrated, "data silos" can be created. With data silos, multiple, potentially inconsistent, versions of data can exist (for example, if a customer address is updated in one software application but not in another). Or, data can be incomplete, such as if certain transactions are recorded in one software application or database but not in another. If it were feasible to integrate information from multiple data models, these issues could be more easily addressed, however, data integration itself presents challenges.

That is, typically an individual or team of individuals manually undertake a schema matching task. Given that thousands of schema elements can exist in both schemas, matching the two schemas can be extraordinarily time consuming and complex. Errors can be likely to occur, and may not be caught until later testing, or in worse case scenarios when the data models are used in a production environment. Additional work is typically required to implement the schemas for productive use in computing tasks, as the output of an initial schema matching process is typically in a conceptual format, and recorded in a manner that cannot be directly implemented in a computing system. For example, the outcome of the schema matching process may be a spreadsheet having mapping information for schema elements. This initial output may then be converted by more technical users into a physical data model that can be implemented. However, the conversion process involves even more effort, and provides additional possibilities for the introduction of errors. Further, data models are often changed—entities can be added or removed, attributes can be modified, and relations between schema elements can change. Thus, even despite the huge effort in producing a schema mapping, mappings can quickly become out of date, and incorrect, as it can be difficult to capture schema changes in a way that is quickly and easily transferred to a "global data model," or an electronic document, file, or data object that captures schema matching information. Accordingly, room for improvement exists.

The present disclosure provides innovations that can help address the issues noted above. In particular, the present disclosure provides a core semantic model to which domain models can be mapped. A "domain" can represent a particular computing system, software application, expression format (for example, a particular modeling language or representation), data source or use case.

In a particular implementation, when a domain model is created (or updated) model elements are required to be mapped to elements of the core model. If a corresponding core model element does not exist, it can be created, and the domain model element mapped to the core model element and created. Data model elements that are mapped between a domain model and a core model can include data objects (such as tables or views), data object elements (such as attributes/columns), and relations between data object elements (including hierarchical relations, such class/subclass relations, or "component" relations, such as where an attribute can be considered a component of a table). Because multiple domain models are mapped to a common core model, integrating schemas is much easier, including determining when one domain model should be updated based on changes to another domain model.

The mapping of multiple domain models also facilitates schema mapping/comparison between two different domains. Relations between domain model elements can be expressed as identifiers for a pair of elements of one or more domains and an identifier of a relation type between the elements. For example, the information can be maintained in a triple having the format (model element 1, relation type, model element 2). In the case where a table is a model element and possible table attributes are also model elements, an example triple could be (employee table, has attribute, employee name).

If different domains are mapped to a common core semantic model, similarities and differences can be readily determined. Similarities can be determined by two domain elements of different domains having a relation with the same core model element, along with having a common relation type (which can also be expressed as a core model element). In the case where domain model information is stored as triples, a comparison can involve forming a triple that contains core model elements that are mapped to by domain model elements. If core model representations of two domain model elements (or, an expression of a relationship between pairs of domain model elements of the two different domains) of the different domains are the same, then the domains can be considered to have those domain elements in common. Unmatched triples can reflect differences between domain models.

To assist in the explanation of disclosed techniques, particular examples are provided that relate to conceptual data models, physical data models, and implementations/instantiations of physical data models that are used in relational database systems, or other models (such as CDS views or BusinessObjects) that indirectly reference objects in a relational database. However, disclosed techniques can be used with other types of modelling, including process modelling. In some cases, elements of a process model can be implemented in a computing language to facilitate computer-implemented tasks, such as a computer-implemented workflow.

The present disclosure also provides techniques to help facilitate deployment of domain models, especially when the deployment includes multiple domains that need to be integrated in one environment. As mentioned, even when a data model is developed, it typically needs to be deployed to allow practical use of the modelled elements.

In some aspects, disclosed techniques can employ a model validator to analyze a data model prior to deployment, such as to confirm that all elements of a domain model are mapped to an element of a core data model. Other checks can include checking to see if elements of a domain model comply with a naming convention, or with custom checks that an entity may define.

Disclosed techniques can also help actual deployment of a domain model, such as by using adapters/transformers to convert elements of a domain model into commands that can be implemented in a particular deployment environment. For example, relations in a domain model between a table and its attributes can be analyzed to generate appropriate DDL commands to generate the table in a database.

Example 2—Example Use of Data Models by Software Applications

FIG. 1 presents a computing environment 100 that illustrates how different software applications can use different data models, and how at least one software application can integrate information from multiple data models.

In particular, in FIG. 1, a first application 108 uses a first data model 112, where the first data model includes a first data object 116 (or "data artifact"), such as a table or view. The first data object 116 includes a plurality of attributes, includes attributes A, B, and C, labelled as attributes 120*a*-120*c*.

A second application 130 uses a second data model 134, where the second data model includes a second data object 138. The second data object 138 can have a semantic meaning in common with the first data object 116, such as where both data objects provide information for a "customer." The second data object 138 is shown as having attributes 142a-142d. Attributes 142a and 142b correspond to different versions, A', B', of the attributes 120a, 120b, A, B, of the first data object 116. That is, the attributes 142a, 142b, 120a, 120b can have a common semantic meaning, but may use different identifiers or be implemented in different formats. Attribute 142c, attribute C, can be identical to attribute C, 120c, of the first data object 116. That is, the attributes 142c, 120c can have the same semantic meaning and a common representation/identifier. Attribute 142d, attribute D, represents an attribute that is related to the semantic concept of the second data object 138 (and therefore also the first data object 116), but which is not included in the first data object.

A third data model 150 exists, having a third data object 154, which can have a common semantic meaning with the first data object 116 and the second data object 138. The third data object 154 has attributes 158a-158e. In this case, attributes 158b and 158d, attributes B' and D', correspond directly to the attributes 142b, 142d of the second data object 138. Attribute 158c is a version of another attribute C, as represented by attributes 120c and 142c, while attribute 158a is a further version of attribute A, as represented by attributes 120a and 142a. Attribute E, 158e, is an additional attribute in the third data object 154 that relates to the common semantic of the data objects 116, 138, 154.

Now, consider that the second application 130 would like to integrate data from the second data model 134 that it uses by default, along with data maintained in the first data model 112 and the third data model 150. The first data object 116 contains different versions (or representations) of attributes A and B than the second data object 138. Thus, for data model integration, it would first need to be determined that the first data object 116 and the second data object 138 represent a common semantic concept, and then it would need to be determined that the different representations of attributes A and B represent common semantic concepts.

In a similar manner, it would need to be realized that the third data object 154 has a common semantic with the second data object 138, that attributes 158a, 158c, and 158d represent different versions of the attributes 142a, 142c, and 142e, and that attribute 158e is related to the same semantic concept as the second data object.

As explained in Example 1, a single data model can include thousands of data model elements, and so aligning or matching two data models can be extremely resource intensive.

Figure 2:
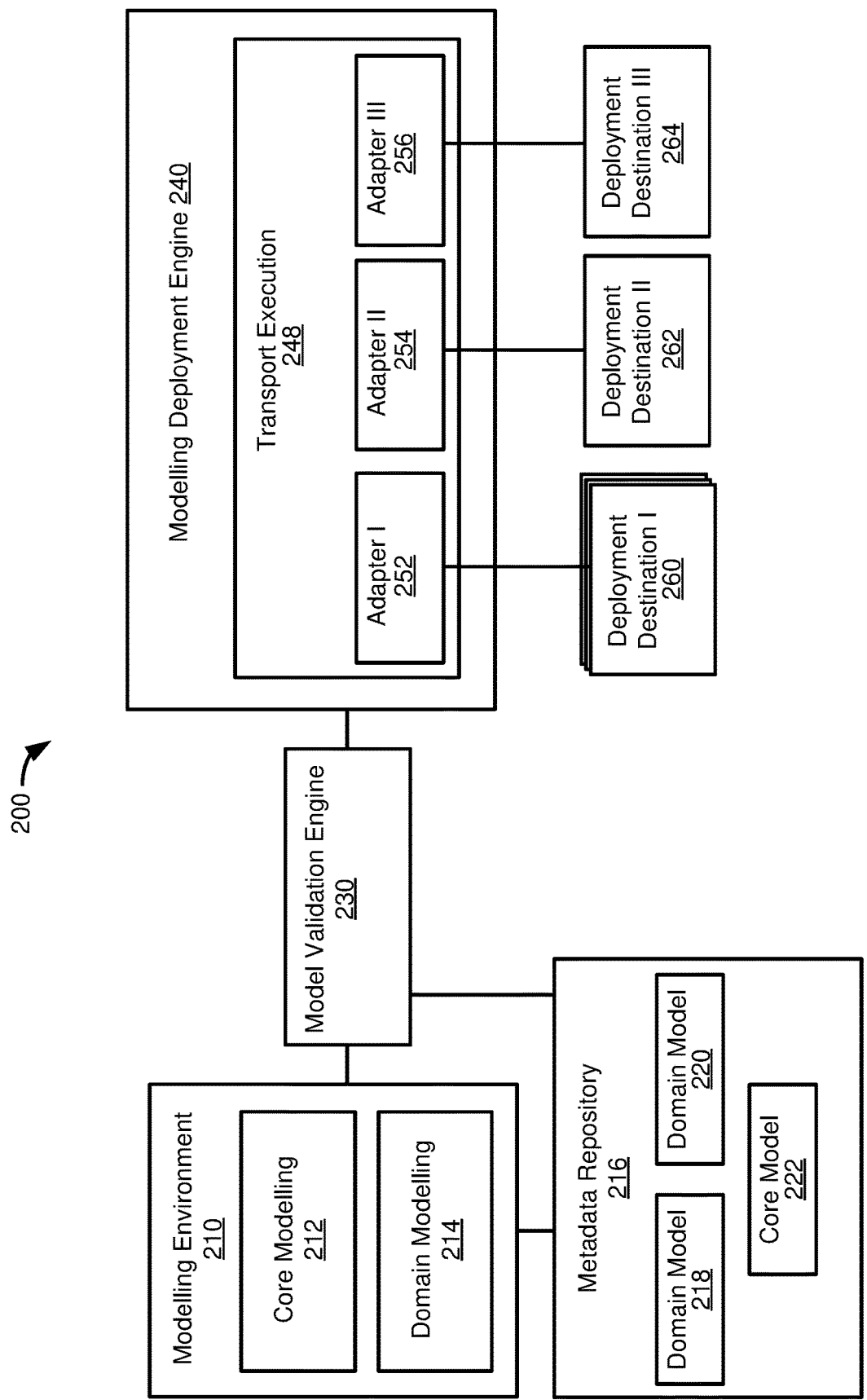
FIG. 2 is a diagram illustrating a computing environment in which disclosed technologies can be implemented, including where a modelling environment can be used to create data models that can then be validated or deployed.

Example 3—Example Computing Environment Useable to Map Domain Data Models to a Core Data Model, and to Deploy Such Domain Data Models FIG. 2 illustrates a computing environment 200 in which disclosed techniques can be implemented. In general, the computing environment 200 includes a modelling environment 210, a model validation engine 230, and a model deployment engine 240. Note that all of the components of the computing environment 200 are not required. In particular, disclosed modelling techniques can use the modelling environment 210, but the validation engine 230 or the model deployment engine 240 can be optional. Facilitating schema matching/integration using the modelling environment 210 can be beneficial even if other techniques are used to validate or deploy a data model.

The modelling environment 210 includes a core data modelling functionality 212 and domain modelling functionality 214. The core and domain modelling functionality 212, 214 can be used to produce core 222 and domain data models 218, 220 that can be stored in a metadata repository 216. The properties of, and relations between, the core data model 222 and domain data models 218, 220 with be further explained in Example 4. Although the core modelling functionality 212 and the domain modelling functionality 214 are shown as collocated, these modelling functionalities can be implemented in different computing systems, software applications, modules, etc., provided that the domain modelling functionality can access the core data model 222.

The model validation engine 230 can perform various checks on a domain data model 218, 220, or optionally on the core data model 222. The types of checks that can be performed by the model validation engine 230 are further described in Example 9.

Validations can be performed at various times, such as when a domain data model 218, 220 is created, and a save operation is performed, or when updates are made and indicated as to be saved/committed. In another implementation, the model validation engine 230 can be called when a domain data model 218, 220 is to be deployed.

The model deployment engine 240 can be used to deploy a domain data model 218, 220 to a particular deployment destination. A deployment destination can be a particular computing system, and can include a component, such as a database, which implements data model elements of a domain data model 218, 220. A deployment destination typically has one or more software applications that can access data stored in an implementation (or instance) of a domain model. However, in some cases a deployment destination stores data in an implementation of a domain data model 218, 220, but the information therein is accessed using external computing systems, such as in web or cloud-based applications.

The model deployment engine 240 is shown as including a transport execution component 248. The transport execution component can be responsible for generating commands that can be used to implement elements of a domain data model 218, 220 in a particular deployment destination. Different deployment destinations can use different formats and commands to store and access data stored in a data model. As an example, a variety of relational databases exist, but software from different vendors can have different capabilities or commands. As another example, one deployment destination could be a relational database, and another deployment destination could be a key-value store, such as storing model elements as JSON objects.

Accordingly, the transport execution component 248 is shown as including a first adapter 252, a second adapter 254, and a third adapter 256. The first adapter 252 is used with a plurality of instances of a first type of deployment destination 260. The instances can represent, for example, different instances of particular database software. In some cases, the first adapter 252 can include at least some information that is specific to a particular instance of the first type of deployment destination 260. This type of information can include connection information or authorization information. However, the different instances of the first type of deployment destination 260 use a common set of commands to create data model elements of a domain data model 218, 220, which allows for the use of a common adapter.

The second and third adapters 254, 256 can be used to instantiate domain models in second and third types of deployment destinations 262, 264. Consistent with the discussion above, in a particular example, the first adapter 252 can process domain model information into SQL commands (such as DDL statements) for the deployment destination 260, while the second adapter 254 can process the domain model information to produce JSON objects for the deployment destination 262, and the third adapter 256 can convert domain model information into a knowledge graph for the deployment destination 264.

Figure 3:
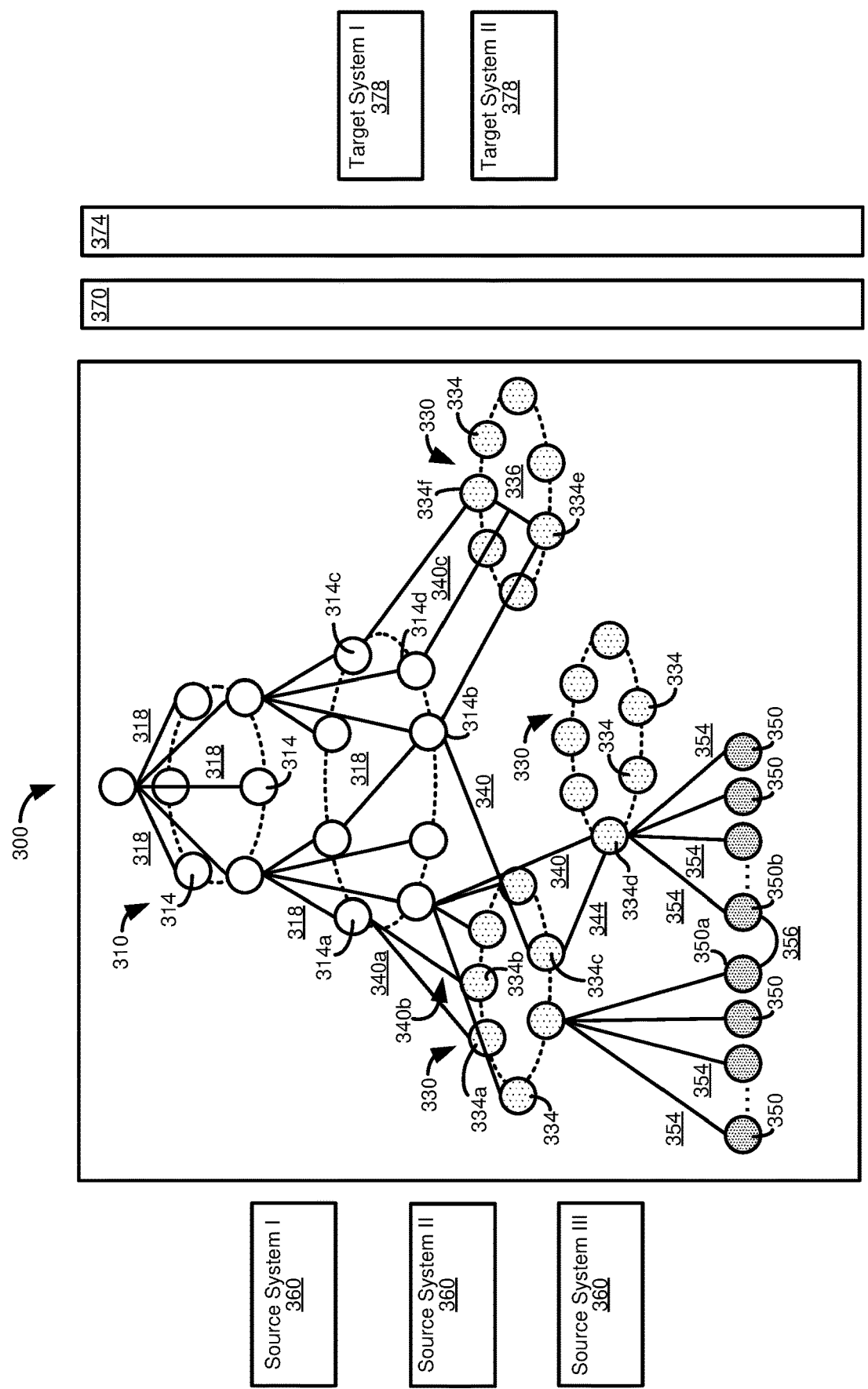
FIG. 3 is a diagram illustrating relations between domain data models and a core data model.

Example 4—Example Relations Between Elements of Multiple Domain Data Models and a Core Data Model FIG. 3 illustrates a computing environment 300 that depicts how a core data model can relate to multiple domain models, and how the domain models can be used by source and target computing systems.

FIG. 3 illustrates a core data model 310, having core nodes 314 (empty circles). Core nodes 314 of the core data model 310 represent particular semantic concepts. Note that in the core data model 310, nodes 314 can represent model elements of different types. The core data model 310 can be implemented in a number of ways, but in a particular example it is implemented as a knowledge graph (the transformation between different implementations can be based on rules that can be derived from the conceptual core model and a domain model). However, it can be useful to consider the nodes 314 as elements of a relational database data model. Some nodes 314 can represent data objects, such as a tables or views. Other nodes 314 can represent attributes (columns/fields) of the tables or views and are modelled as classes.

The core nodes 314 are related by core edges 318. The core edges 318 define particular types of relations between a pair of connected core nodes 314. Although the core data model 310 is shown as having a single core edge 318 between any pair of connected core nodes 314, in at least some implementations multiple core edges can exist between a pair of core nodes.

The core edges 318 help define how the core nodes 314, and their associated semantic concepts, can be used to produce a data model that can be implemented in a computing system. The core edges 318 can also be used to describe hierarchical relations between core nodes 314, where a hierarchical relation can also be used in defining more complex modelling concepts from the core nodes 314.

Continuing the example of the core nodes 314 and core edges 318 being useable to represent a data model of a relational database, one core node can represent a table, and other core nodes can represent attributes. A complete table can be defined by relating the core node 314 representing the table to the core nodes representing attributes using a core edge 318 of a suitable relation type. For example, a core node 314 representing the table can be linked to the core nodes representing its attributes using a core edge 318 of type "has attribute" or "has component." Note that relations between core nodes 314 can be expressed from the "point of view" of either core node. Using the previous example, the core nodes 314 representing table attributes can be related to the core node representing the table using a core edge 318 of type "attribute of" or "component of." A relation in one direction between core nodes 314 can be referred to as a "relation" (which can also be referred to as a "relationship" or a "predicate"), while the relation considered in the other direction can be referred to as an "inverse relation" (or "inverse relationship" or "inverse predicate"). A given relation or inverse relation can represent an instance of a particular relation type.

FIG. 3 also illustrates a plurality of domain models 330. A domain model 330 represents a particular implementation of at least a portion of the core nodes 314 of the core data model 310, and their associated relations (including as indicated by core edges 318). The domain models 330 are shown as including domain nodes 334. In at least some implementations, relations between domain nodes 334, at least within a given domain model 330, are not expressed using edges between domain nodes. Rather, edges 340 link a domain node 334 with its corresponding core node 314. Relations between domain nodes 334 can be determined by analyzing the core edges 318 that exist between a pair of core nodes 314 that are linked to the domain nodes by their corresponding edges 340. In other cases, edges can be used to directly link domain nodes 334, where the edges can be optionally linked (via edges) to corresponding core edges 318.

FIG. 3 illustrates how domain nodes 334 from multiple domain models 330 can be linked to a common core node 314. For example, edges 340a and 340b link domain nodes 334a, 334b to core node 314a. In practice, many domain nodes 344 from multiple domain models 330 will be linked to common core nodes 314. The single common core node 314a is shown for simplicity of presentation.

Domain nodes 334 of different domain models 330 can be related. For example, domain node 334c is linked to domain node 334d using an edge 344. In at least some cases, edges 344 between domain nodes 334, or at least between domain nodes of different domain models 330, are not related to a core node 314 or a code edge 318 of the core data model 310. In particular, since the core data model 310 represents general semantic concepts which are represented in different domain models 330, the core data model may not be "aware" that different domains exist, or at least that two domain models have a more direct relation.

As an example of relations between domain nodes 334 of different domains, consider that a node in a first domain represents a "business process" and has a relation to a corresponding core node 314. A second domain may include a domain node 334 that contains a "process element" node that is linked to the same core node 314 as the domain node of the first domain. Thus, the domain nodes 334 of the first and second domains can represent the same semantic concept, in the form of the core node 314.

In FIG. 3, a dotted oval about domain nodes 334 indicates domain nodes of a particular domain. For simplifying the presentation in FIG. 3, individual connections between domain nodes 334 with a common domain are not shown. In general, the domain nodes 334 can have edges that are similar to the edges 318. The edges connecting domain nodes 334 are in turn connected to a core node 314, where the core node represents a particular relation type (which can be a class relation or an instance relation).

FIG. 3 provides an illustrative example of relations between domain nodes 334, and a mapping of the relation to a core node 314. That is domain nodes 334e and 334f are related to core nodes 314b and 314c, respectively, and are connected to one another by an edge 336, which establishes a relation between those domain nodes. The edge 336 is associated with a type, represented by a core node 314d, as indicated by edge 340c. In a similar manner, edges 318 between core nodes 314 can be themselves mapped to another core node, representing a relation type (but which is not specifically illustrated in FIG. 3 for simplicity of presentation).

One or more instances 350 of a domain node 330 can be created, and are related to the domain nodes via edges 354. Instances 350 are specific to a particular domain node 334, and therefore specific to a particular domain model 330. Note that relations can also be established between domain instance nodes 350. For example, a node 350a in a first domain can represent a business process of "accrual management," while a node 350b in a second domain can have a process element "manage accruals" with a similar meaning. Relations between domain instance nodes 350 can be represented as edges, in a similar manner as the edges 318, 336, 354, as shown by an edge 356.

Domain models can be associated with multiple source systems 360. That is, a source system 360 can represent a computing system from which modelling information is obtained, and can also represent a computing system to which a domain model 330 will be deployed. FIG. 3 illustrates how a validation engine 370 and a model deployment engine 374, which can correspond to the components 230, 240 of FIG. 2, can be used to deploy a domain model to one or more target computing systems 378. As described, a given computing system can be both a source computing system 360 and a target computing system 378, since a domain model 330 typically is deployed in some format before it is used. However, in some cases a source system 360 is used to create a domain model 330, and then the domain model is deployed to a different target computing system 378. A domain model 330 can be deployed to multiple target computing systems 378, including in a scenario where one of the target computing systems is also a source computing system 360 and the other is not (or, at least it is not a source computing system with respect to the particular domain model being deployed).

Example 5—Example Mapping of Domain Data Models and Core Data Model and Identification of Domain Data Models Domains are associated with domain identifiers. A domain identifier allows the core data model to track what domain data models, or elements thereof, are associated with a core data model, or particular elements of a core data model. The relation between a core data model and domain data models is illustrated in FIG. 4, which also illustrates a particular example of a domain identifier.

Figure 4:
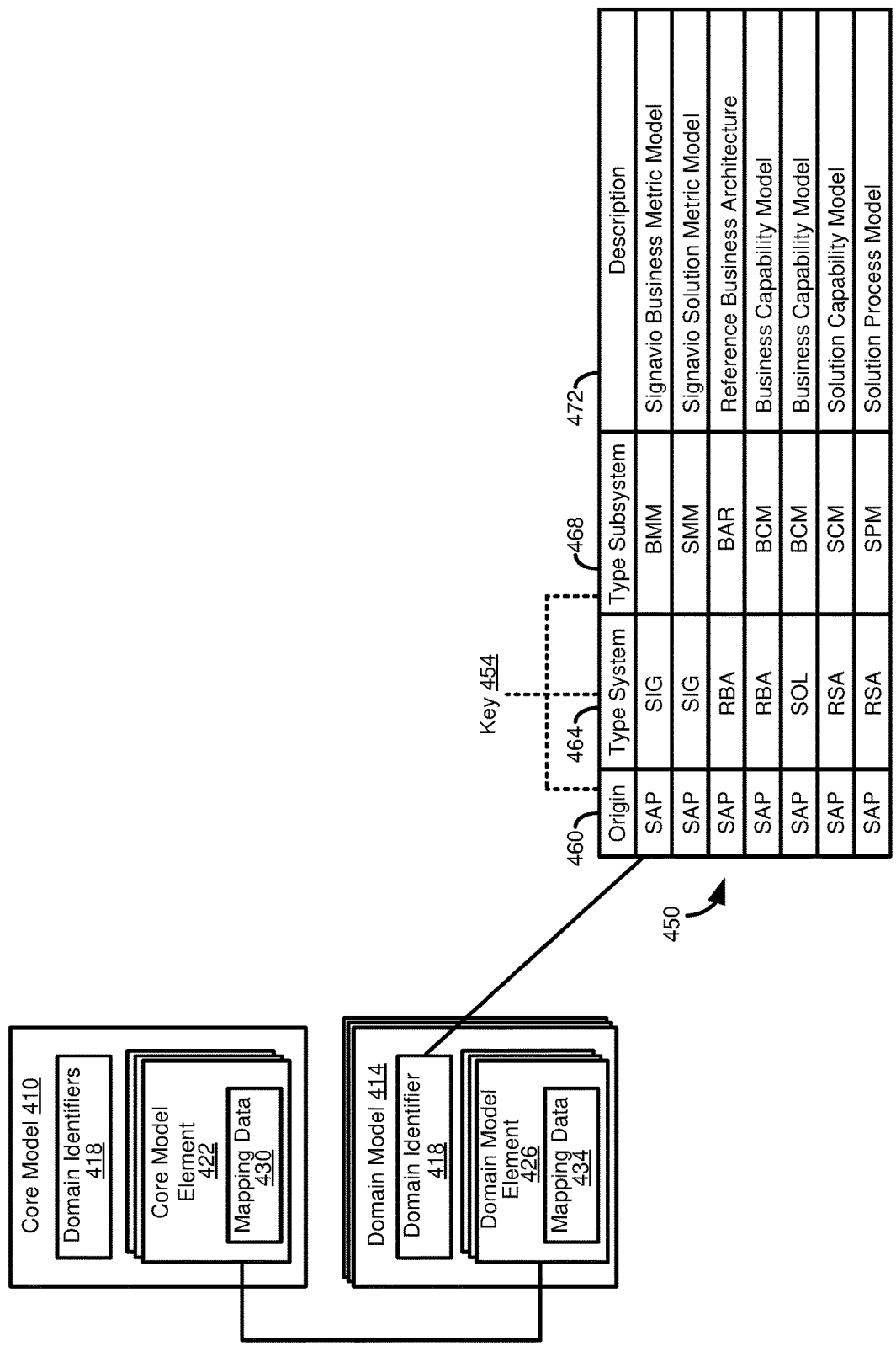
FIG. 4 is a diagram providing details about how domain data models can be mapped to a core data model, and how domain data models can be identified.

In particular, FIG. 4 illustrates a core data model 410 that is related to one or more domain data models 414. The core data model 410 can store domain identifiers 418 for domains models 414 that are mapped to one or more core data model elements 422 of the core data model. As discussed above, in some cases information, such as metadata, for a core data model element 422 can include the domain identifiers 418 for particular domain data models 414 (including specific domain data model elements 426 of a given domain data model). Information about particular domain data model elements 426 that are mapped to a given core data model element 422 can be stored in mapping data 430 for a given core data model element. Similarly, information about how a given domain data model element 426 of a given domain data model 414 is mapped to a core data model element 422 can be stored in mapping data 434 for the domain data model element. While in some cases the mapping information 430, 434 is stored with information for a given model element 422, 426, in other cases the mapping information can be maintained in another way. For example, the core data model 410 or a domain data model 414 can store mapping information 430, 434 for their associated model elements 422, 426, such as in the form of a table that correlates core data model elements with domain data model elements. Correlations between core and domain model elements can include storing information about relations between edges connecting domain model elements, such as mapping a relation between two domain model elements to a particular type represented as a core model element.

In a particular example, a domain identifier 418 can have the form illustrated in a table 450 of FIG. 4. In this case, a domain identifier 418 is represented as a key 454 (such as a primary key) that is formed from a column 460 indicating an "origin" of the domain, which can be, for instance, a particular software company/vendor. A given software company/vendor can have multiple products or software applications that have domain data models, and so the particular product/software application with which a domain data model 414 is associated can be provided in a column 464. Accordingly, a type system might be used to distinguish the models/schemas of different products of one vendor. Even a particular software application, product, or model format can have multiple models. Models can be associated with different use cases, such as where a given use case is associated with model elements having different purposes, where some domain data models 414 can have different semantic elements but can also share some semantic elements. Accordingly, a "subsystem" identifier can be provided in a column 468. A more human-understandable description of the purpose of a given domain data model 414 can be provided in a column 472.

Figure 5:
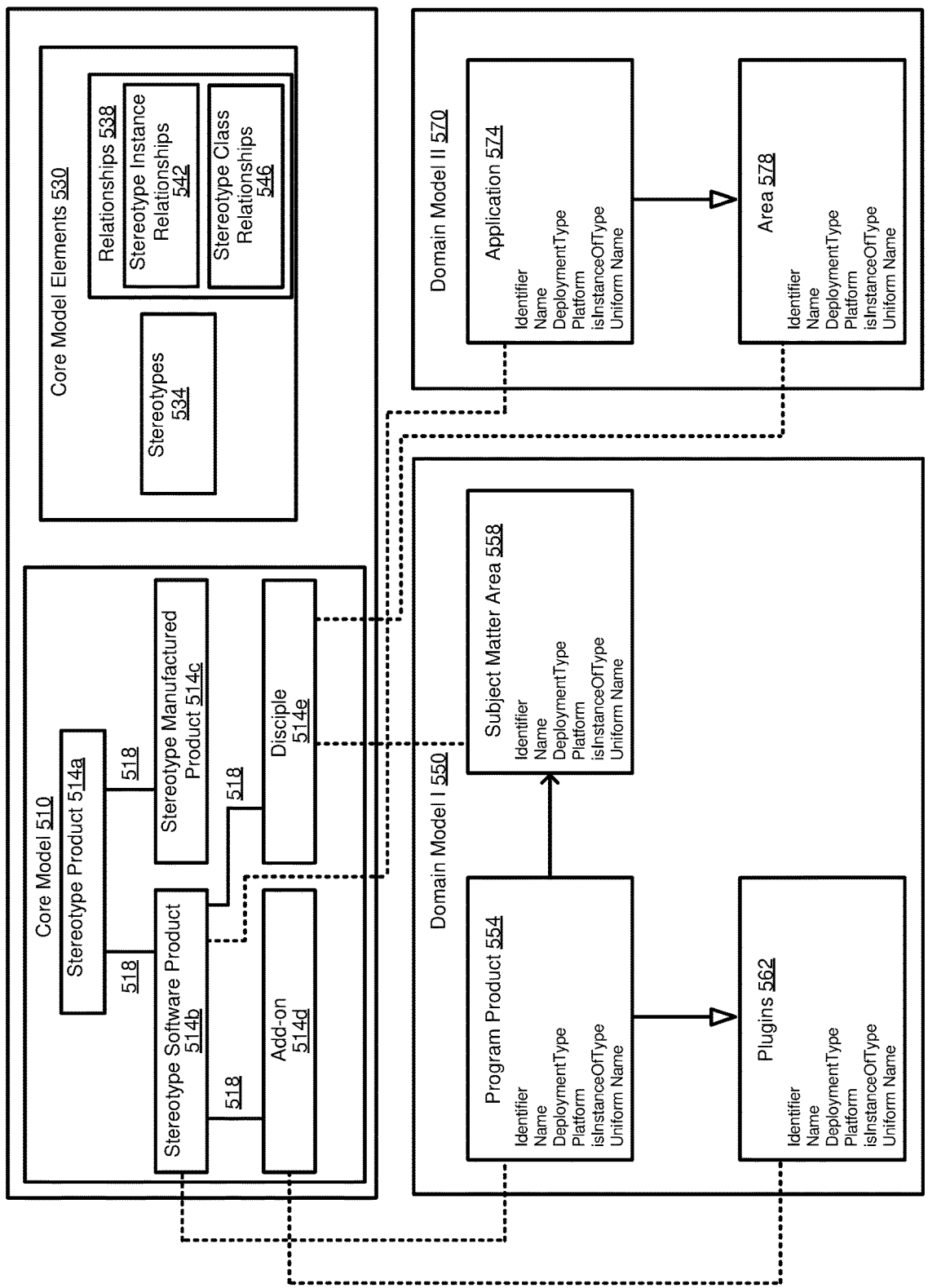
FIG. 5 is a diagram providing a practical illustration of how elements of two different domain data models can be mapped to at least some common elements of a core data model.

Example 6—Example Domain Data Models and Their Mapping to a Common Core Data Model FIG. 5 provides further information about elements of core data models and domain data models, and how they can be related. FIG. 5 illustrates a core data model 510 that has "stereotypes" 514, shown as stereotypes 514a-514e. "Stereotype" can have the meaning as used in the Unified Modelling Language. That is, a stereotype 514 can represent a particular type or class of modelling element. Stereotypes 514 can have different types of relations 518 with other stereotypes.

Relations 518 and stereotypes 514 can be independent. For example, different pairs of stereotypes 514 can have the same type of relation 518. In the example shown in FIG. 5, a product stereotype 514a is shown as being related to a software product 514b and a manufactured product 514c. The relation 518 can represent a class-subclass relation. For example, from the point of view of the stereotype 514a, the relation with stereotypes 514b, 514c can be a "has subclass" or "has subtype" relation. From the point of view of the stereotypes 514b, 514c, the relation with stereotype 514a can be a "is subclass of" or "is subtype of." Similar to how different stereotypes can have a common type of relation, different types of relations can be specified for a common pair of stereotypes.

Continuing with the example, the software product stereotype 514b can be related to an add-on stereotype 514d, which can represent a particular type of software product. Software products can be used in different fields or disciplines, and thus the software product stereotype 514b can be related to a disciple 514e.

In some cases, a core data model 510 can be predefined and expressed as stereotypes and their relations. In other cases, a specific core data model 510 is not predefined, but rather is created as domain data model elements are linked to stereotypes and relation types. Or, at least the core data model 510 is implicitly described by the stereotypes and relation types.

As shown, FIG. 5 includes core data model elements 530, including stereotypes 534 and relations 538. As will be further discussed, when a domain data model is created, domain data model elements can be linked to stereotypes 534, and a relation of the relations 538 specified for linking two of the domain data model elements.

As will be further discussed, relations 538 can relate stereotypes 534, and their corresponding domain data model elements, in different ways. In particular, instance relations 542 can relate two instances of two stereotypes 534, while class relations 546 can relate all instances of the stereotypes having the class relations. Class relations 546 can be used to define inheritance trees.

As an example, a relation, or "instance relation," can indicate a relationship between two particular instances of the domain class, such as where a particular table domain class is defined with respect to various attribute domain classes using a "has component" relation type. On the other hand, a class relation can reflect an inheritance relation, such as a parent-child relationship, where all children have the properties of the parent, even though they may have additional properties. As illustrated in FIG. 5, the program product class 554 and the plugin class 562 can have a class relation, where the plugin class is a subclass of the program product class.

As an illustration of another way differences between a class relation and an instance relation can be used, consider that the granularity of modelling concepts can vary in different domains. This variance can lead to a representation of similar concepts where in one domain this might be a class whereas in another domain an instance.

As a more concrete illustration, consider two domains that represent process data, where classes of the different domains can have class relations (and could also have instance relations). Domain A represents business processes through three different classes that represent different granularities in terms of processes having components: end to end process, process module, and process segment. Domain A can include relations such as 'end to end process has component process module' and 'process module has component process segment.'

Domain B represents all business process related data through one class, 'business process,' and uses a classifier business process type to represent different granularities. In this case, component relationships are recursions of business processes.

In that sense the instances of business process type in domain B will correspond to classes in domain A. Relationships can then be established between the two: the instance business process module (of business process type) in domain B corresponds to class process module in domain A.

FIG. 5 illustrates how multiple domain data models can be created and mapped to the stereotypes 514 in the core data model 510, or to the stereotypes 534 as expressed in the core data model elements 530. A domain data model 550 includes a program product "class" 554 (where a "class" could also be referred to as a type or category). The program product class 554 is mapped to the software product stereotype 514*b*. Thus, the program product class 554 and the product stereotype 514 refer to a common semantic concept. Note that aspects of the stereotype 514*b* and the program product class 554 can differ, even though they refer to the same semantic concept. For example, a name used for the stereotype 514*b* and the class 554 can differ, which could make it difficult to realize that these modelling elements refer to the same semantic concept absent the mapping.

Now consider a domain data model 570. The domain data model 570 includes an "application" model element 574. The application model element 574 is also mapped to the software product stereotype 514*b*. Since both the class domain data model element 554 and the application domain data model element 574 are mapped to the common product stereotype 514*b*, it can be determined that these domain data model elements refer to the same semantic concept, thus allowing these aspects of domain data model 550 and domain data model 570 to be mapped to one another.

In a similar manner, a "subject matter area" class 558 of the domain data model 550 and an "area" class 578 of the domain data model 570 are both mapped to the disciple stereotype 514*e* of the core domain data model 510, allowing it to be determined that the classes 558, 578 have a common semantic meaning.

Note that elements of domain data models can differ (e.g., in name), even if one or more elements of both domain data models are mapped to a common stereotype in a core data model. Similarly, in some cases domain elements of different domain data models can have the same semantic (as reflected by their being related to a common stereotype), but the domain data models can have different relations between domain data model elements, but where the relations are of types that may also be expressed as defined types in the core data model 510.

FIG. 5 illustrates how domain data models need not have an exact overlap. In particular, the domain data model 550 has a "plugins" class 562 that is mapped to the "add-on" stereotype 514*d* of the core data model 510. The domain data model 570 lacks a class that is mapped to the stereotype 514*d*.

Again, it may be helpful for the reader to consider the above discussion in the context of relational database modelling. Some of the stereotypes in a core data model, including the stereotypes 534, can represent tables, while other stereotypes can represent attributes that can be included in a table. Consider that both the domain data model 550 and the domain data model 570 have classes that represent a table associated with the same stereotype of a core data model. Even if both domain data models 550, 570 have a table with a common semantic meaning, the tables need not have all attributes in common. Thus, domain data model 550 may have a set of one or more classes that serve as table attributes, while the domain data model 570 has a different set of one or more classes. Typically, it may be expected that some attributes of the table as represented in the two domain data models 550, 570 would overlap, since the tables share a common semantic meaning, but not all attributes of one table need be in another table, and in some cases the tables may have no attributes in common. In the case where the tables do have some attributes in common, mapping those attributes (domain data model classes) to common stereotypes in a core data model can help integrate or relate the two domain data models, 550, 570.

Example 7—Example Maintenance of Relation Types

FIGS. 6 and 7 provide examples of the instance relation types 542 and the class relation types 546 of FIG. 5. In particular, FIG. 6 includes a table 610 that lists various instance relation types. The table 610 includes a column 612 that includes a type for a given relation expressed in the table (where a row of the table corresponds to a relation type), where a relation makes a statement, affirmation, or assertion about a subject to which the relation is applied. A name for the relation type, such as a more human understandable name, can be provided in a column 614.

A description of the relation type can be provided in a column 616. The description can explain the meaning of a relation indicated by a given relation type. As shown, example uses of the relation type can also be provided. In the case of the relation type indicated by row 630 of the table 600, the relation type indicated in column 612 is "HasComponent," which can be used, for example, to indicate that a table has particular attributes.

As mentioned above, a relation can be considered from the point of view of either model element in the relation. So, while a table may have a "HasComponent" relation with an attribute, the attribute can have an inverse of that relation, indicated in a column 618, of an "isComponentOf" relation with a table.

The table 610 includes a column 620 listing an identifier for a given relation type, while a column 622 lists any parent relation types for a given relation type. As an example, the "HasComponent" relation type of the row 630 can be considered as a more specific implementation of a "HasPart" relation type of table row 634, which in turn can have a parent relation type (or predicate) of Has (which is not shown as a row in the table 610).

To further illustrate relation instances, a list 680 of additional example relation types is provided.

FIG. 7 provides a table 710 that is similar to the table 610 of FIG. 6, but provides example class relation types between stereotypes (and therefore any corresponding domain model classes that are mapped to a pair of related stereotypes). Like the table 610, the table 710 has a column 712 providing a relation type, a column 714 providing a name for the relation type, a column 716 providing a description of the relation type and example uses, a column 718 identifying the inverse of the relation type of the column 712, a column 720 providing an identifier for the relation type, and a column 722 identifying any parent relation types for a given row of the table 710.

Example 8—Example User Interface Screens for Defining Domain Data Model

In some aspects of the present disclosures, users who create data models, such as domain data models, are required to map elements of a domain data model to elements of a core data model. Requiring such action can help ensure that different data models from particular domains can be related to one another.

Figure 8A:
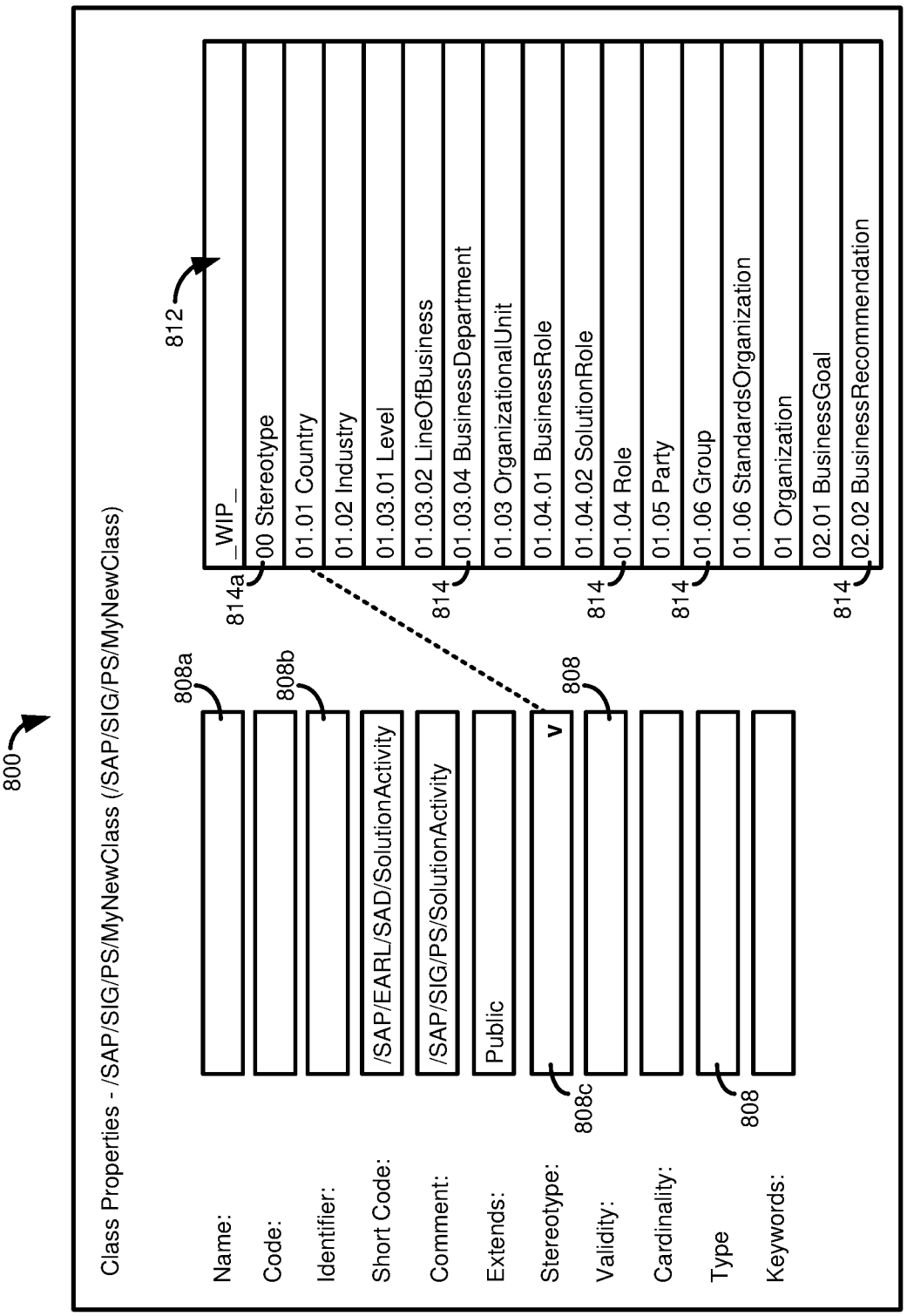
FIG. 8A provides an example user interface screen for mapping a domain class to a stereotype of a core data model, while FIG. 8B provides an example user interface screen for assigning a relation type of a core data model to two related domain model classes.
Figure 8B:
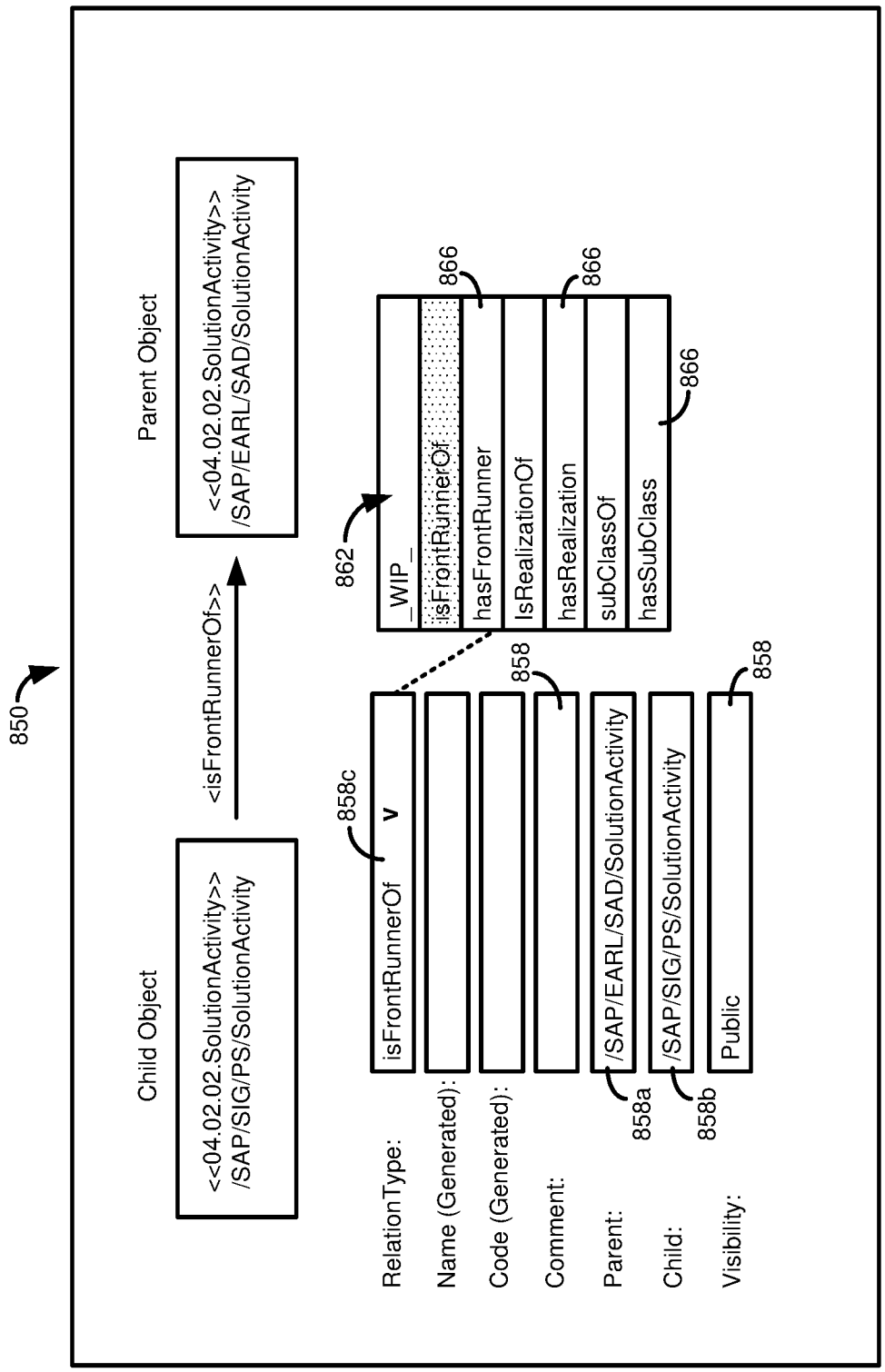

FIGS. 8A and 8B provide example user interface screens 800, 850 that can be used in data model creation. User interface screen 800 illustrates how domain classes can be created and mapped to core model stereotypes, while user interface screen 850 illustrates how relations can be specified between two domain classes (where, again, the relation also has a type that is mapped to a type specified in a core data model).

While the user interface screen 800 provides a number of data entry fields 808, particular attention is called to a field 808a that allows a name to be specified for a domain class being created, and a field 808b that allows an identifier for the domain class to be specified. Before domain class creation can be completed, a user is required to specify in a data entry field 808c a stereotype of the core data model to which the domain class will be mapped. The backend logic that receives data through the user interface screen 800 can generate an error and not create/persist a domain class until a stereotype is specified.

In the example shown, the data entry field 808c can be implemented as a dropdown menu 812 that lists stereotypes 814 that have been created/are available in the core data model. A stereotype 814a can be selected if none of the provided stereotypes corresponds to the domain class. In that case, selection of the stereotype 814a can cause a user interface screen to be displayed that allows a new stereotype to be created in the core data model. Once that stereotype has been created, it can be provided in an updated display of the dropdown menu 812, selected by the user, and the domain class created.

The list of stereotypes 814 also demonstrates how hierarchical information can be maintained for stereotypes, such as for the stereotypes 534 of FIG. 5. A stereotype 814 at a highest level is given a value with a first radix point, such as 01. Dependent stereotypes 814 can have the same value for the first radix point, but add a value for a second radix point, such as 01.01 for a first dependent stereotype and 01.02 for a second dependent stereotype that is at the same hierarchical level as the first dependent stereotype. A stereotype that depends from the second dependent stereotype can be so indicated by keeping the values for the first and second radix points, but adding a value for a third radix point, such as 01.02.01.

The user interface screen 850 of FIG. 8B illustrates data entry fields 858, including a data entry field 858a that allows a user to identify a parent domain class and a data entry field 858b that allows a user to identify a child domain class. Data entry field 858c allows a user to make a required selection of a core relation type that relates the parent and child domain classes, such as using a drop-down menu 862 that lists relation types 866. As with the user interface screen 800, backend logic that receives data through the user interface screen can generate an error and not create/persist relations between domain classes until a core relation type is mapped to the relation being created.

Example 9—Example Components for Validating and Deploying Domain Data Models

As described with respect to FIG. 2, the present disclosure provides techniques to assist with validating and deploying domain data models having elements mapped to a core data model. Further details about validation and deployment processes are described with respect to FIG. 9.

FIG. 9 illustrates a modelling data repository 904 that includes a core data model 906 and one or more domain data models 908 that are mapped to one or more elements of the core data model, as has been described.

A model validation engine 920 can be called to perform various checks on a domain data model 908. In some cases, the checks can be performed when a domain data model 908 is selected for deployment. In other cases, checks can be performed as a domain data model 908 is being created, or checks can be requested at a point after domain model creation and before a domain model is selected for deployment.

Figure 10:
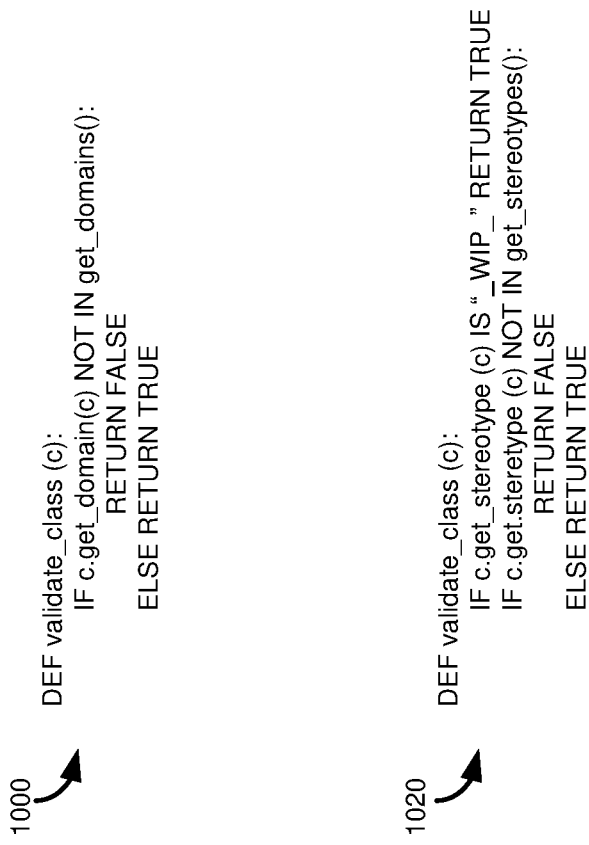
FIG. 10 illustrates example code for checking whether a domain mapped to a domain class exists, and example code for checking whether a stereotype to which a domain class is mapped exists.

A domain check 922 analyzes whether a given domain model 908 to which a domain class is assigned exists. If the domain model 908 does not exist, a user can be prompted to create the domain, or assign the domain class to a different domain. In the case where a domain model is to be created, a user can provide a domain identifier, including domain identifiers as have been previously discussed. Example code 1000 for checking whether a domain assigned to a domain class exists is provided in FIG. 10.

Returning to FIG. 9, a stereotype assignment check 924 can perform one or more operations. One operation can be to determine whether a domain class has been mapped to a stereotype of the core data model 906. When a domain class has been mapped to a stereotype of the core data model 906, another operation of the stereotype assignment check 924 can be to determine whether the stereotype exists. That is, for example, it could be that a stereotype of the core data model 906 was deleted after a domain class of a domain data model 908 was initially mapped to the stereotype. In some cases, a user may mark a domain class as "work in progress," in which case one or more of the operations of the stereotype assignment check 924 can be omitted. Example code 1020 for determining whether a stereotype exists is provided in FIG. 10.

Returning to FIG. 9, a relation type assignment check 926 can be similar to the stereotype assignment check 924, checking to see if a relation between two domain classes has been mapped to a relation type of the core data model 906, and whether that relation type exists in the core data model. For example, a relation between two domain classes may only be established if a corresponding relation type has been created, which can include checking relation type dependencies. That is, a "process has component activity relation" to be assigned may not be assignable if a "has component" parent relation type has not been defined. Again, operations associated with the relation type assignment check 926 can be omitted if associated domain model elements are marked as work in progress.

In some cases, different operations can be performed as part of the relation type assignment check 926 depending on whether a relation is an instance relation or is a class relation. Or, separate checks can be defined for instance relations and class relations. For example, when checking instance relations, it can be checked to confirm that domain classes are mapped to other domain classes (with an "instance" relation type), and not to stereotypes of the core data model 906. Alternatively, this operation can be performed as part of class-class relation checks, in addition to, or in place of, performing the operation as part of checking instance relations.

A release status check 928 can determine whether a domain data model 908, and/or its associated core data model 906, have a status indicating that they can be "released"—such as being deployable to a computing system for productive use. The operations of the release status check can also include analyzing a release status for domain model elements (domain classes or domain relations). If any data model elements are marked as work in progress, for example, and validation is being performed as a precursor to deployment of a domain model, an error message can be generated. Work in progress checks were also described as being operations performable as part of the stereotype assignment check 924 or the relation assignment check 926. These operations can be included in the release status check 928 in addition to, or in place of, performing the operations as part of the assignment checks 924, 926.

A naming convention check 930 can analyze domain class names and relation names to determine whether they comply with particular naming conventions. As an example, a naming convention may be to use camelCase for domain class names, relation names, or both. Optionally, the naming convention check 930 can automatically correct at least certain naming convention errors, or provide recommended corrections, such as if two words are separated by a space when the camelCase format has been specified. Although described as separate checks, the operations of the naming convention check 930 can be implemented as operations in another check, such as in the stereotype assignment check 924 or the relation check 926.

Some types of checks can be defined in advance as part of a data model development and deployment framework, such as checks to enforce mapping of domain data model elements to core data model elements. However, other checks can be manually added by a particular user/entity as custom checks 932. Custom checks can include checks that review properties of a domain that involve more than one domain node. For example, a custom check can be to check an overall integrity of a domain, such as a minimum number of relations between domain nodes.

The model validation engine 920 can include repair logic 934. The repair logic 934 can be used to automatically correct, or at least suggest corrections, for any errors that were encountered during validation. For example, the camelCase repair logic discussed above can be incorporated into the repair logic 934 where the repair logic can optionally include logic to address other types of errors.

A model deployment engine 960 can perform operations to deploy a selected domain data model 908 to a particular computing system, optionally after the domain data model has been validated by the validation engine 920. Referring back to FIG. 2, the model deployment engine 240, to which the model deployment engine 960 can correspond, can include a plurality of adapters 252-256 that convert a domain data model into a format used by a respective deployment destinations 260-264, and execute operations to deploy the domain data models to such deployment destinations.

An adapter 252-256 can implement a transport definition 968. A transport definition 968 can include various classes of operations to analyze a domain data model, convert domain data model information to a deployable format, and deploy the converted data model information to a deployment destination. In a particular example, an interface can be defined for a transport definition 968. Classes associated with the interface can be programed to include suitable code for converting domain data model elements to a particular format. In this way, if a new adapter is needed, such as to deploy a domain data model to a new type of operating environment, new code can be written for the interface and the existing framework of FIGS. 2 and 9 then used to deploy domain data models.

Functionality in a transport definition 968 can be defined for particular types or classes of domain data model information. In some cases, at least some of this data model information is sequentially deployed to a deployment destination. For example, domain classes can be deployed to cause the creation of corresponding objects in a deployment destination, and then relations between the objects can be created in the deployment destination as a separate step.

In particular, the transport definition 968 can include a stereotype transport class 972. The stereotype transport class 972 can cause stereotype objects to be created in a deployment destination. For example, the stereotypes can be created as entries in a dictionary of the SIGNAVIO modelling software available from SAP SE of Walldorf, Germany. The stereotype information can be useful at a deployment destination to allow comparisons between different domain data models. Correspondingly, instance relation types and class relation types can be processed by an instance relation type class 976 and a class relation type class 980. In some cases, the transport definition 968 can differ from the specific example shown in FIG. 9. For example, a single transport class may be defined that is responsible for the operations of both the instance relation type class 976 and the class relation type class 980.

Similar to the stereotype transport class 972, the transport definition 968 can include a domain transport class 984, which transports domain data model classes, an instance relation transport class 988 that transports instance relations between domain data model classes, and a class relation transport class 992 that transport class relations between domain data model cases. As with relations for stereotypes, optionally a single transport class can transport both instance relations and class relations. As has been described, the domain classes and their relations can be mapped to stereotypes and relation types of a core data model.

The transport definition 968 can also include a domain metadata transport class 996. The metadata transport class can be responsible for transforming metadata for a domain into a particular deployment language. Metadata can include a name of a domain, a description of a domain, a version of a domain, dependencies on other domains, or versions of dependency information.

Example 10—Example Data Model Definition

Figure 11:
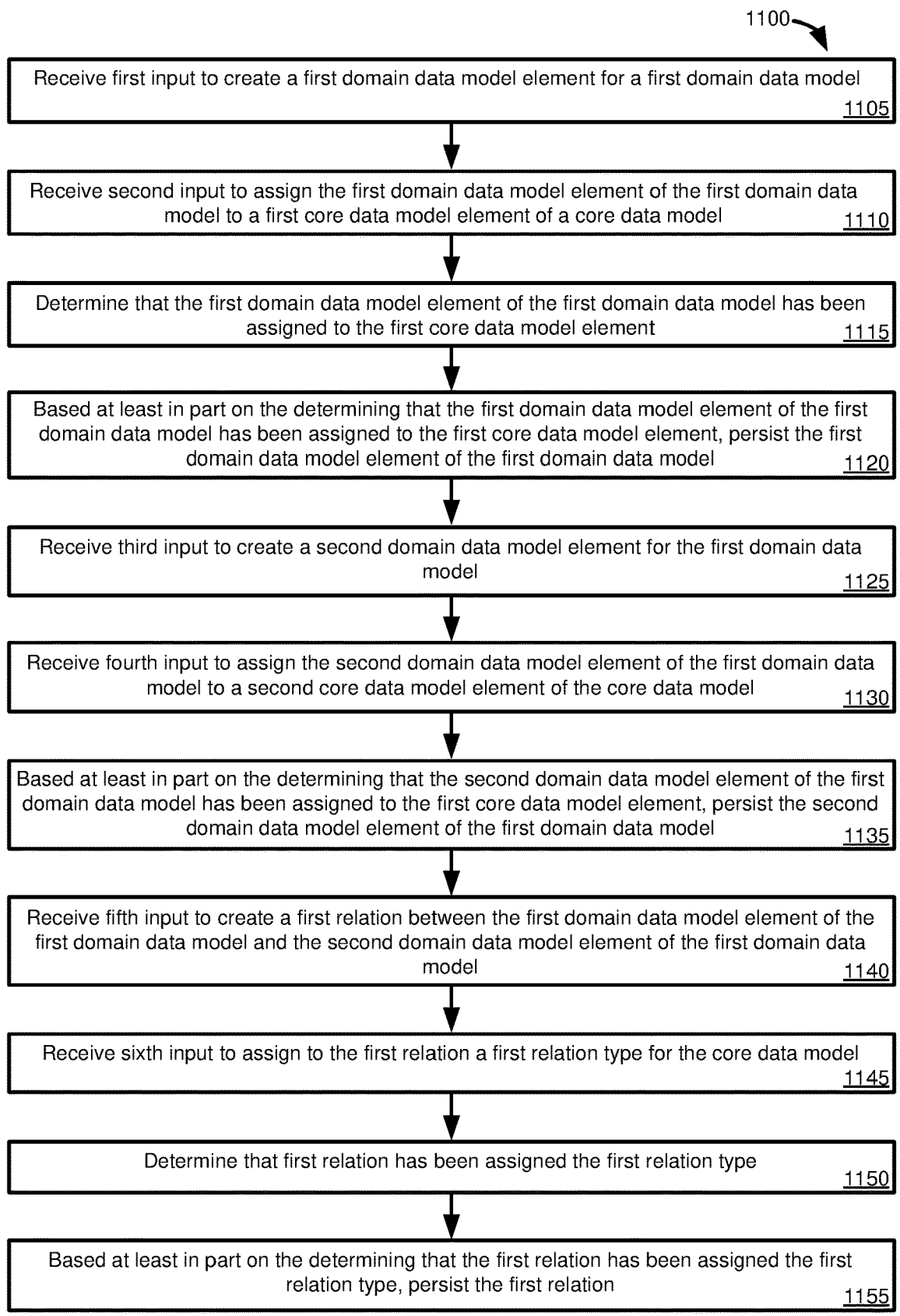
FIG. 11 is a flowchart of a process of creating a domain data model, including mapping elements of the domain data model to elements of a core data model.

FIG. 11 provides a flowchart of a process 1100 of creating a domain model, including mapping elements of the domain model to elements of a core model.

At 1105, first input is received to create a first domain data model element for a first domain data model. Second input is received at 1110 to assign the first domain data model element of the first domain data model to a first core data model element. It is determined at 1115 that the first domain data model element of the first domain data model has been assigned to the first core data model element. At 1120, based at least in part on the determining that the first domain data model element of the first domain data model has been assigned to the first core data model element, the first domain data model element of the first domain data model is persisted.

Third input is received at 1125 to create a second domain data model element for the first domain data model. At 1130, fourth input is received to assign the second domain data model element of the first domain data model to a second core data model element. Based at least in part on the determining that the second domain data model element of the first domain data model has been assigned to the first core data model element, the second domain data model element of the first domain data model is persisted at 1135.

At 1140, fifth input is received to create a first relationship between the first domain data model element of the first domain data model and the second domain data model element of the first domain data model. Sixth input to assign to the first relationship a first relationship type for the core data model is received at 1145. It is determined at 1150 that the first relationship has been assigned the first relationship type. At 1155, based at least in part on the determining that the first relationship has been assigned the first relationship type, the first relationship is persisted.

Example 11—Computing Systems

Figure 12:
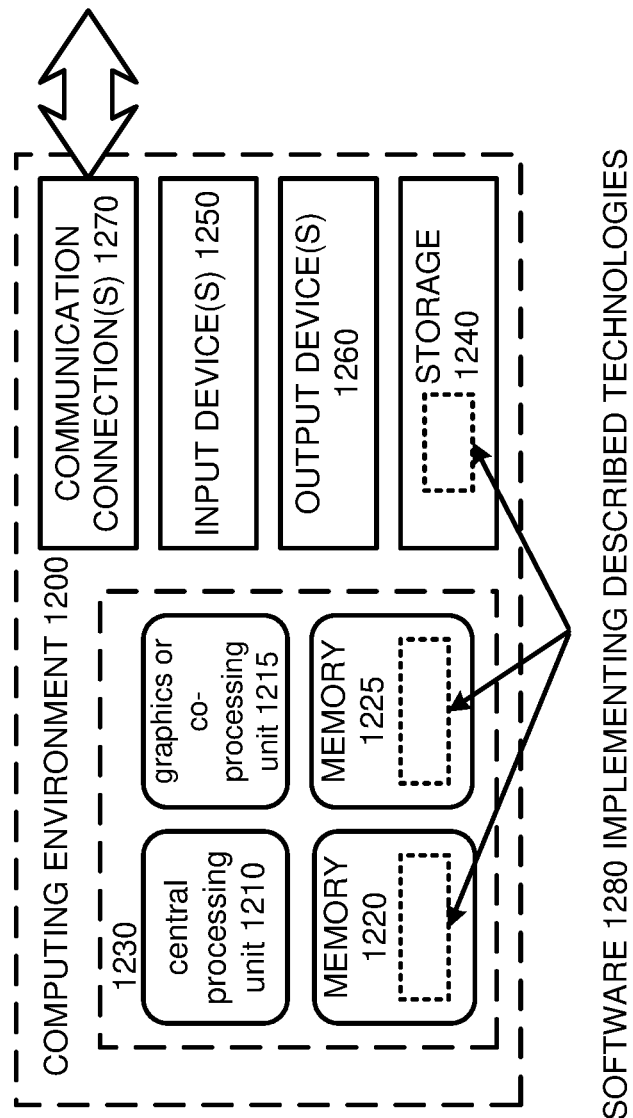
FIG. 12 is a diagram of an example computing system in which some described embodiments can be implemented.
Figure 13:
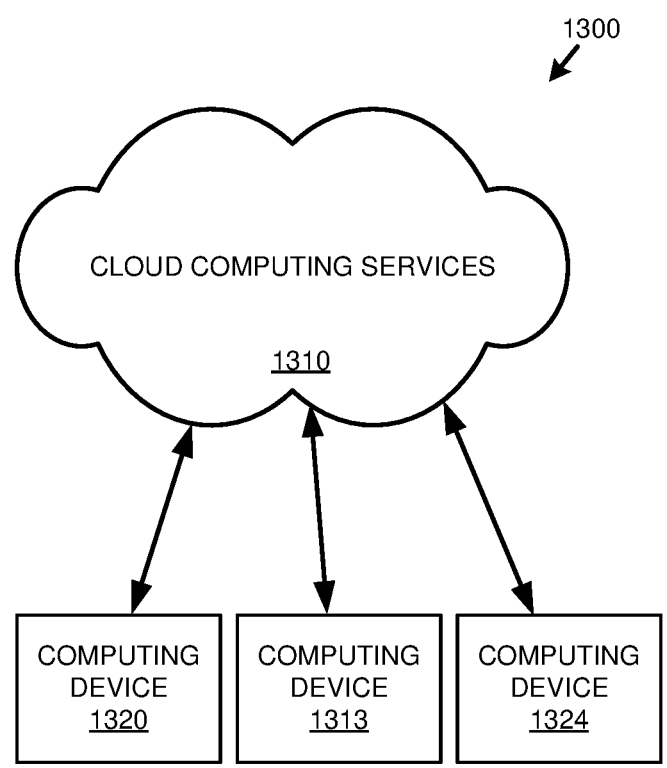
FIG. 13 is an example cloud computing environment that can be used in conjunction with the technologies described herein.

FIG. 12 depicts a generalized example of a suitable computing system 1200 in which the described innovations may be implemented. The computing system 1200 is not intended to suggest any limitation as to scope of use or functionality of the present disclosure, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions, such as for implementing technologies described in Examples 1-10. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s) 1210, 1215. The memory 1220, 1225 stores software 1280 implementing one or more innovations described herein, in the form of computer-executable instructions suitable for execution by the processing unit(s) 1210, 1215.

A computing system 1200 may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way, and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 12—Cloud Computing Environment

FIG. 22 depicts an example cloud computing environment 2200 in which the described technologies can be implemented. The cloud computing environment 2200 comprises cloud computing services 2210. The cloud computing services 2210 can comprise various types of cloud computing resources, such as computer servers, data storage repositories, networking resources, etc. The cloud computing services 2210 can be centrally located (e.g., provided by a data center of a business or organization) or distributed (e.g., provided by various computing resources located at different locations, such as different data centers and/or located in different cities or countries).

The cloud computing services 2210 are utilized by various types of computing devices (e.g., client computing devices), such as computing devices 2220, 2222, and 2224. For example, the computing devices (e.g., 2220, 2222, and 2224) can be computers (e.g., desktop or laptop computers), mobile devices (e.g., tablet computers or smart phones), or other types of computing devices. For example, the computing devices (e.g., 2220, 2222, and 2224) can utilize the cloud computing services 2210 to perform computing operators (e.g., data processing, data storage, and the like).

Example 13—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1220 and 1225, and storage 1240. The term computer-readable storage media does not include signals and carrier waves. In addition, the term computer-readable storage media does not include communication connections (e.g., 1270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, R, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one memory;
   one or more hardware processing units coupled to the at least one memory; and
   one or more computer readable storage media storing computer-executable instructions that, when executed, cause the computing system to perform operations comprising:
   receiving first input to create a first domain data model element for a first domain data model;
   receiving second input to assign the first domain data model element of the first domain data model to a first core data model element of a core data model, wherein core data model elements of the core data model serve as stereotypes representing a particular type or class of model element;
   evaluating a first condition that requires domain model elements to be assigned to an element of the core data model;
   based on the evaluating the first condition, determining that the first domain data model element of the first domain data model has been assigned to the first core data model element;
   based at least in part on the determining that the first domain data model element of the first domain data model has been assigned to the first core data model element, persisting the first domain data model element of the first domain data model, wherein the first domain data model element is not persisted if it has not been assigned to the first core data model element;
   receiving third input to create a second domain data model element for the first domain data model;
   receiving fourth input to assign the second domain data model element of the first domain data model to a second core data model element of the core data model;
   evaluating, for the second domain data model element, the first condition that requires domain model elements to be assigned to an element of the core data model;
   based on the evaluating the first condition for the second domain data model element, determining that the second domain data model element of the first domain data model has been assigned to the second core data model element;
   based at least in part on the determining that the second domain data model element of the first domain data model has been assigned to the second core data model element, persisting the second domain data model element of the first domain data model, wherein the second domain data model element is not persisted if it has not been assigned to the second core data model element;
   receiving fifth input to create a first relation between the first domain data model element of the first domain data model and the second domain data model element of the first domain data model;
   receiving sixth input to assign to the first relation a first relation type for the core data model;
   evaluating a second condition that requires relationships between domain model elements to be assigned to a relation type of the core data model;
   based on the evaluating the second condition, determining that the first relation has been assigned the first relation type; and
   based at least in part on the determining that the first relation has been assigned the first relation type, persisting the first relation, wherein the first relation is not persisted if the relation type has not been assigned to the first relation.

2. The computing system of claim 1, the operations further comprising:
   receiving seventh input to create a first domain data model element for a second domain data model, the second domain data model being different than the first domain data model; and
   receiving eighth input to assign the first domain data model element for the second domain data model to the first core data model element.

3. The computing system of claim 2, the operations further comprising:
   receiving ninth input to create a second domain data model element for the second domain data model; and
   receiving tenth input to assign the second domain data model element for the second domain data model to the second core data model element.

4. The computing system of claim 3, the operations further comprising:
   receiving eleventh input to create a first relation between the first domain data model element of the second domain data model and the second domain data model element of the second domain data model; and
   receiving twelfth input to assign to the first relation between the first domain data model element of the second domain data model and the second domain data model element of the second domain data model the first relation type for the core data model.

5. The computing system of claim 4, the operations further comprising:
   receiving a request to compare the first domain data model with the second domain data model; and
   comparing mappings of the first domain data model to the core data model with mappings of the second domain data model to the core data model.

6. The computing system of claim 1, the operations further comprising:
   receiving a request to persist the first domain data model element of the first domain data model;
   determining that the first domain data model element has not been assigned to an element of the core data model; and
   not persisting the first domain data model element in response to the request.

7. The computing system of claim 6, the operations further comprising:

generating a message that the first domain data model element of the first domain data model has not been assigned to an element of the core data model, wherein the second input is received in response to the message.

8. The computing system of claim 1, the operations further comprising:
causing a user interface screen to be rendered allowing a user to generate a domain data model element;
receiving a request through the user interface screen to assign the first domain data model element to a core data model element;
displaying a list of available core data model elements of the core data model; and
receiving the second input through the user interface screen.

9. The computing system of claim 8, the operations further comprising:
in response to the displaying the list of available core data model elements, receiving seventh input through the user interface screen to create a new core data model element; and
creating the first core data model element.

10. The computing system of claim 1, the operations further comprising:
causing a user interface screen to be rendered allowing a user to generate a domain data model element;
receiving a request through the user interface screen to relate the first domain data model element to the second domain data model element;
displaying a list of available core data model relation types; and
receiving the fifth input through the user interface screen.

11. The computing system of claim 10, the operations further comprising:
in response to the displaying the list of available core data model relation types, receiving seventh input through the user interface screen to create a new core data model relation type; and
creating the new core data model relation type.

12. The computing system of claim 1, the operations further comprising:
receiving a request to check the first domain data model; and
in response to receiving the request to check the first domain data model, determining whether domain data model elements of the first domain data model are assigned to core data model elements of the core data model.

13. The computing system of claim 1, the operations further comprising:
receiving a request to check the first domain data model; and
in response to the request to check the first domain data model, determining whether relations between domain data model elements of the first domain data model are assigned to relation types defined for the core data model.

14. The computing system of claim 1, the operations further comprising:
receiving a first request to deploy the first domain data model to a first deployment destination;
determining a first format used by the first deployment destination; and
deploying the first domain data model to the first deployment destination in the first format.

15. The computing system of claim 14, the operations further comprising:

receiving a second request to deploy the first domain data model to a second deployment destination;
determining a second format used by the first deployment destination, the second format being different than the first format; and
deploying the first domain data model to the second deployment destination in the second format.

16. The computing system of claim 1, the operations further comprising:
receiving a request to compare the first domain data model with a second domain data model; and
comparing mappings of the first domain data model to the core data model with mappings of the second domain data model to the core data model.

17. A method, implemented in a computing system comprising at least one hardware processor and at least one memory coupled to the at least one hardware processor, the method comprising:
receiving first input to create a first domain data model element for a first domain data model;
receiving second input to assign the first domain data model element of the first domain data model to a first core data model element of a core data model, wherein core data model elements of the core data model serve as stereotypes representing a particular type or class of model element;
evaluating a first condition that requires domain model elements to be assigned to an element of the core data model;
based on the evaluating the first condition, determining that the first domain data model element of the first domain data model has been assigned to the first core data model element;
based at least in part on the determining that the first domain data model element of the first domain data model has been assigned to the first core data model element, persisting the first domain data model element of the first domain data model, wherein the first domain data model element is not persisted if it has not been assigned to the first core data model element;
receiving third input to create a second domain data model element for the first domain data model;
receiving fourth input to assign the second domain data model element of the first domain data model to a second core data model element of the core data model;
evaluating, for the second domain data model element, the first condition that requires domain model elements to be assigned to an element of the core data model;
based on the evaluating condition for the second domain data model element, determining that the second domain data model element of the first domain data model has been assigned to the second core data model element;
based at least in part on the determining that the second domain data model element of the first domain data model has been assigned to the second core data model element, persisting the second domain data model element of the first domain data model, wherein the second domain data model element is not persisted if it has not been assigned to the second core data model element;
receiving fifth input to create a first relation between the first domain data model element of the first domain data model and the second domain data model element of the first domain data model;
receiving sixth input to assign to the first relation a first relation type for the core data model;

evaluating a second condition that requires relationships between domain model elements to be assigned to a relation type of the core data model;
based on the evaluating the second condition, determining that the first relation has been assigned the first relation type; and
based at least in part on the determining that the first relation has been assigned the first relation type, persisting the first relation, wherein the first relation is not persisted if the relation type has not been assigned to the first relation.

18. The method of claim 17, further comprising:
receiving seventh input to create a first domain data model element for a second domain data model, the second domain data model being different than the first domain data model;
receiving eighth input to assign the first domain data model element for the second domain data model to the first core data model element;
receiving ninth input to create a second domain data model element for the second domain data model;
receiving tenth input to assign the second domain data model element for the second domain data model to the second core data model element;
receiving eleventh input to create a first relation between the first domain data model element of the second domain data model and the second domain data model element of the second domain data model; and
receiving twelfth input to assign to the first relation between the first domain data model element of the second domain data model and the second domain data model element of the second domain data model the first relation type for the core data model.

19. The method of claim 18, further comprising:
receiving a request to compare the first domain data model with the second domain data model; and
comparing mappings of the first domain data model to the core data model with mappings of the second domain data model to the core data model.

20. One or more non-transitory computer-readable storage media comprising:
computer-executable instructions that, when executed by a computing system comprising at least one hardware processor and at least one memory coupled to the at least one hardware processor, cause the computing system to receive first input to create a first domain data model element for a first domain data model;
computer-executable instructions that, when executed by the computing system, cause the computing system to receive second input to assign the first domain data model element of the first domain data model to a first core data model element of a core data model, wherein core data model elements of the core data model serve as stereotypes representing a particular type or class of model element;
computer-executable instructions that, when executed by the computing system, cause the computing system to evaluate a first condition that requires domain model elements to be assigned to an element of the core data model;
computer-executable instructions that, when executed by the computing system, cause the computing system to, based on the evaluating, determine that the first domain data model element of the first domain data model has been assigned to the first core data model element;
computer-executable instructions that, when executed by the computing system, cause the computing system to, based at least in part on the determining that the first domain data model element of the first domain data model has been assigned to the first core data model element, persist the first domain data model element of the first domain data model, wherein the first domain data model element is not persisted if it has not been assigned to the first core data model element;
computer-executable instructions that, when executed by the computing system, cause the computing system to receive third input to create a second domain data model element for the first domain data model;
computer-executable instructions that, when executed by the computing system, cause the computing system to receive fourth input to assign the second domain data model element of the first domain data model to a second core data model element of the core data model;
computer-executable instructions that, when executed by the computing system, cause the computing system to evaluate, for the second domain data model element, the first condition that requires domain model elements to be assigned to an element of the core data model;
computer-executable instructions that, when executed by the computing system, cause the computing system to, based on the evaluating the first condition for the second domain data model element, determine that the second domain data model element of the first domain data model has been assigned to the second core data model element;
computer-executable instructions that, when executed by the computing system, cause the computing system to, based at least in part on the determining that the second domain data model element of the first domain data model has been assigned to the second core data model element, persist the second domain data model element of the first domain data model, wherein the second domain data model element is not persisted if it has not been assigned to the second core data model element;
computer-executable instructions that, when executed by the computing system, cause the computing system to receive fifth input to create a first relation between the first domain data model element of the first domain data model and the second domain data model element of the first domain data model;
computer-executable instructions that, when executed by the computing system, cause the computing system to receive sixth input to assign to the first relation a first relation type for the core data model;
computer-executable instructions that, when executed by the computing system, cause the computing system to evaluate a second condition that requires relationships between domain model elements to be assigned to a relation type of the core data model;
computer-executable instructions that, when executed by the computing system, cause the computing system to, based on the evaluating the second condition, determine that the first relation has been assigned the first relation type; and
computer-executable instructions that, when executed by the computing system, cause the computing system to, based at least in part on the determining that the first relation has been assigned the first relation type, persist the first relation, wherein the first relation is not persisted if the relation type has not been assigned to the first relation.

* * * * *